United States Patent

Baumgärtl et al.

[11] Patent Number: 6,150,739
[45] Date of Patent: Nov. 21, 2000

[54] CIRCUIT CONFIGURATION FOR SUPPLYING POWER TO ELECTRONIC TRIPPING DEVICE

[75] Inventors: Ulrich Baumgärtl; Wolfgang Röhl, both of Berlin, Germany

[73] Assignee: Siemens AG, Munich, Germany

[21] Appl. No.: 09/147,998

[22] PCT Filed: Sep. 24, 1997

[86] PCT No.: PCT/DE97/02215

§ 371 Date: Mar. 24, 1999

§ 102(e) Date: Mar. 24, 1999

[87] PCT Pub. No.: WO98/13918

PCT Pub. Date: Apr. 2, 1998

[30] Foreign Application Priority Data

Sep. 24, 1996 [DE] Germany ............................ 296 17 365
Sep. 24, 1996 [DE] Germany ............................ 296 17 367

[51] Int. Cl.[7] .................................................. H01H 47/00
[52] U.S. Cl. .......................... 307/130; 323/222; 361/93.6
[58] Field of Search ............................... 307/130, 85, 31; 323/222, 282, 284, 288; 361/93.6

[56] References Cited

U.S. PATENT DOCUMENTS 4,992,723 2/1991 Zyistra et al. ............................ 323/284

FOREIGN PATENT DOCUMENTS

| 0 206 253 | 6/1986 | European Pat. Off. .......... G05F 1/67 |
| 0 206 253 | 12/1986 | European Pat. Off. . |
| 0 130 254 | 9/1988 | European Pat. Off. . |
| 32 46 329 | 6/1984 | Germany . |
| 06 202745 | 7/1994 | Japan . |

OTHER PUBLICATIONS

Markus Niebauer et al., "Solarenergie Optimal Nutzen Intelligentes MPP–Tracking Mit Einen ST62–Mikrocontroller", Elektronik, No. 16, Aug. 6, 1996*.

*Primary Examiner*—Josie Ballato
*Assistant Examiner*—Robert L DeBeradinis
*Attorney, Agent, or Firm*—Kenyon & Kenyon

[57] ABSTRACT

A circuit configuration for supplying power to electronic tripping devices from a current-transforming device. A switched-mode power supply unit, in particular a choke/step-up transforming device having a pulse-width voltage control, is connected downstream of a charging capacitor. Once a set point of the output voltage at an output capacitor is reached, only a very high pulse duty factor is provided. Particularly, maximum power point control is provided during an initial charging phase. Circuit configurations of this kind serve the power supply of overvoltage tripping devices in low-voltage and medium-voltage systems.

3 Claims, 2 Drawing Sheets

CIRCUIT CONFIGURATION FOR SUPPLYING POWER TO ELECTRONIC TRIPPING DEVICE

FIELD OF THE INVENTION

The present invention relates to a circuit configuration for supplying power to electronic tripping devices, the circuit configuration having a current-transforming device, whose output voltage is rectified and can be fed to a charging capacitor, which provides the electronic tripping device with power.

BACKGROUND INFORMATION

Circuit configurations of this kind are described in German Patent No. 32 46 329. When an upper voltage limit is reached, the voltage is short-circuited in such a way that the current of the current-transforming device no longer flows into the charging capacitor. In this switching operation, electromagnetic interference fields arise which corrupt the measurement current, thereby causing erroneous tripping.

European Patent No. 0 130 254 describes relevant tripping device with two capacitors, which are to be charged by the current-transforming device for the operation of this device.

SUMMARY OF THE INVENTION

An object of the present invention is to define a circuit configuration for supplying power to electronic tripping devices, ensuring the lowest possible influence on the current of the current-transforming device, and, in addition, limiting the emission of electromagnetic interference fields to a minimum.

A further object of the present invention is to achieve the quickest possible charging of a capacitor at a voltage which is just sufficient.

According to the present invention, these objects are achieved by the following features:

1.1 A switched-mode power supply unit SNT is connected downstream of charging capacitor CL in the manner of a choke/step-up transforming device DR or a flyback converter SW (according to the transformer principle), 1.2 The switched-mode power supply unit SNT includes a diode DI for charging an output capacitor CA, which is connected in parallel with and functioning as the power supply of electronic tripping device AE, 1.3 The switched-mode power supply unit includes a switching transistor TR to control the charging of output capacitor CA, the switching transistor TR being controlled by a pulse width modulation circuit PW, 1.4 The pulse width modulation circuit PW acts in such a way that when the set point of an output voltage UA at output capacitor CA is reached, then switching transistor TR can be controlled with a very high pulse duty factor, i.e., is only blocking for a short moment in each case, and, as a refinement of the present invention, 1.5 A maximum power point regulator MPP is provided, which is connected with pulse width modulation circuit PW for controlling purposes, controlling it from the beginning of charging output capacitance CA so as to adjust it to optimal power matching (11, 111, . . . ).

By controlling the switching transistor with the pulse width modulation circuit, a constant current is impressed, as opposed to the usual constant-current power supply. In fact, as soon as the output voltage at the output capacitor has reached the set point, the switching transistor is no longer controlled with a low but with a very high pulse duty factor. Accordingly, in the case of very high currents of the current-transforming device, these are led (via the choke/step-up transforming device) through conductively connected transistor TR in the switched-mode power supply unit, and only switched through to output capacitor CA via the diode during the very short opening times of the switching transistor. In the case of high currents, this operating mode maintains the voltage at the charging capacitor low, resulting in an approximately constant power input at a low voltage level. This favors an exact current measurement by the current transformer. The electronic control assembly of the switched-mode power supply unit is supplied with the output voltage of capacitor CA, since the input voltage at the switched-mode power supply unit is too low, particularly in the case of high currents of the current-transforming device. The current is measured in a conventional manner at a shunt resistor, which can also be arranged upstream of the rectifying device if required.

DETAILED DESCRIPTION

Figure 1:
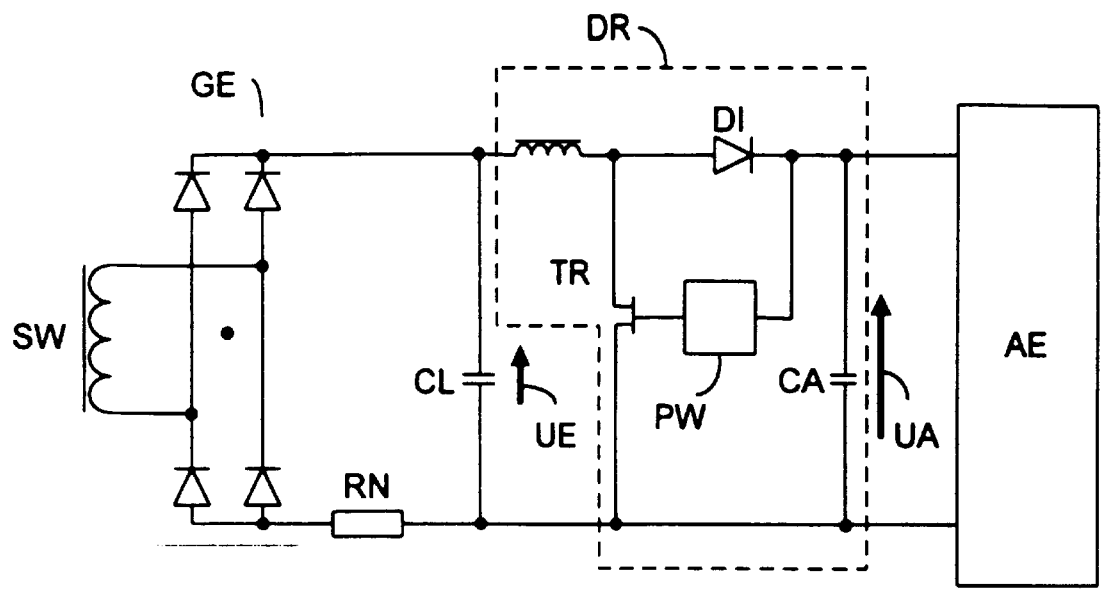
FIG. 1 shows a first embodiment of a circuit configuration according to the present invention.

The present invention is explained by a first exemplary embodiment shown in FIG. 1. FIG. 1 shows only the circuit elements which are essential for understanding the present invention.

The current generated by current-transforming device SW is rectified by rectifying device GE in a conventional manner and is conducted via the choke/step-up transforming device DR either to charging capacitor CL, or, via diode DI, to output capacitor CA, depending on the position of switching transistor TR. Switching transistor TR is controlled by the pulse width modulation circuit in such a way that when output voltage UA at output capacitor CA reaches the set point, the current of current-transforming device SW is conducted via switching transistor TR to charging capacitor CL, arriving via diode DI at output capacitor CA only during the short opening periods of switching transistor TR. In the case of high currents, the voltage at charging capacitor CL is therefore kept at a low value, virtually resulting in an approximately constant power input at a low voltage level.

The current is measured at the shunt resistor in a conventional manner, which can also be arranged upstream of rectifying device GE if required. For high measuring accuracy, a low-impedance resistor is particularly suitable so that the current transformer is nearly short-circuited.

Figure 2:
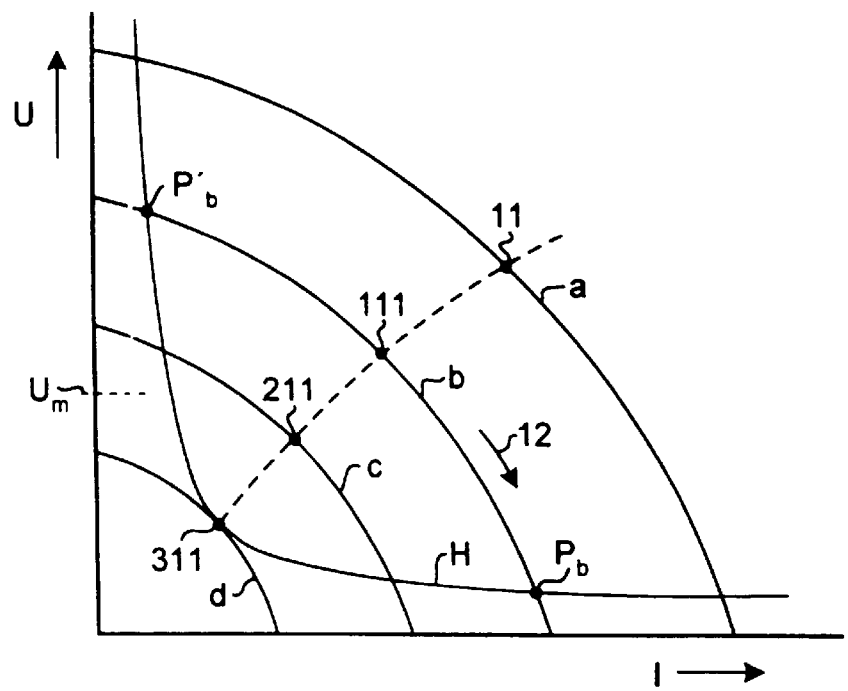
FIG. 2 shows a characteristic of a current transformer, in particular voltage plotted over current between no load operation and short circuit and a power dissipation curve.
Figure 3:
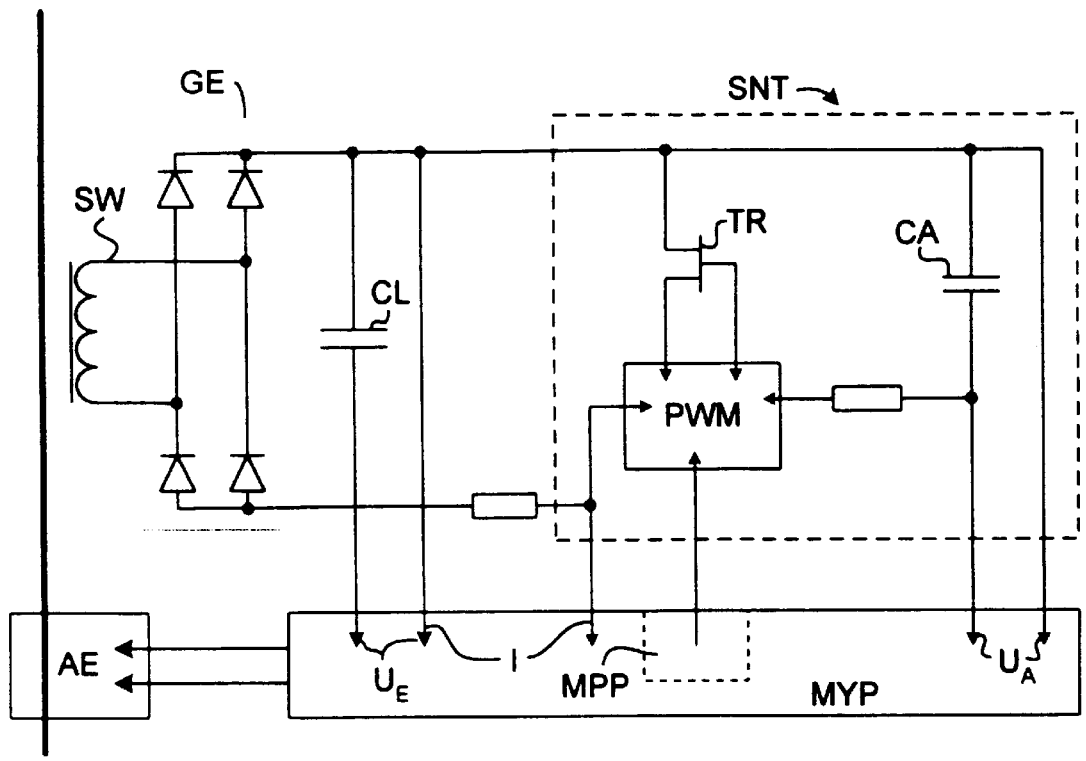
FIG. 3 shows a second embodiment of a circuit configuration according to the present invention for quickly charging an output capacitor.

FIG. 3 explains a second refined embodiment for particularly quickly charging output capacitor CA, on the basis of FIG. 2.

Features 1.1 through 1.4 are also provided in this example embodiment, with feature 1.5 being added. The feature assists in the rapid charging of capacitor CA, namely by achieving operational readiness upon (re)closing. To achieve this objective, a maximum power point (MPP) operation is carried out, first disregarding the required value of output voltage UA.

For further explanation of the present invention and its refinement, reference is made to FIG. 2 showing the characteristic of a current transformer with regard to the curve of voltage and current between no-load operation and short-circuit, the curves a, b, c and d representing currents of different magnitude (as a parameter) flowing through current conductor S, to which the current transformer that is relevant in this context is coupled as a source. Additionally shown and referred to as H is the power dissipation curve showing P=const. for the power demand of tripping device EA and switched-mode power supply unit SNT, both of which must be supplied with power by current transformer SW. The area to the right of and above hyperbola H is the working range available for a circuit according to FIG. 3, which is still to be described, the capacity of current transformer SW being sufficient for the power supply of tripping device AE and switched-mode power supply unit SNT within this working range. The operating point can be freely selected within this range. The fact that the present invention provides a switched-mode power supply unit is particularly advantageous in this context, since, according to one aspect of the invention, output voltage UA at the output of the switched-mode power supply unit and the input of the tripping device can optionally be made independent of input voltage UE at the switched-mode power supply unit, i.e., the output voltage of current transformer SW, depending on the execution of the switched-mode power supply unit with regard to its voltage transformation. Voltages UA and UE are decoupled from each other, for example, in a switched-mode power supply unit, permitting the invention to be executed with a low input voltage UE.

According to the refinement for achieving the further object of the present invention of achieving a rapid charging upon switching on, first, operating point 11, 111, 211, 311 of respective curve a, b, c, d is set, at which maximum power can be transferred from transformer SW into the circuit, the power being adjusted optimally in each case. This adjustment of the operating point occurs here by the accordingly preselected pulse duty factor mentioned earlier, which heretofore, before the present invention, was permanently set empirically and/or at the given voltage UE=UA.

In the present invention, working operation takes place in the characteristics field of curves a, b, c, d with regard to operating point U=f (I). As mentioned above, according to the refinement of the present invention, the charging of output capacitor CA starts at an operating point on the connecting line of points 11, 111, 211 and 311, depending on the output power of the current transformer that is available at that moment. Selecting the operating point on this connecting line optimally ensures rapid charging of output capacitor CA. This operating point, e.g., point 111 for the existing voltage/current relation of curve b, can be maintained by the functioning of the maximum power point (MPP) control, which works in a conventional manner according to the principle of differential shift of operating point and adjustment to the maximum. When the charging of output capacitor CA is nearly or completely finished, the MPP control stops working, and the operating point (the output of the current transformer assumed to remain constant according to curve b) is shifted on curve b in the direction of arrow 12 to point $P_b$, which intersects power dissipation curve H. This occurs by a corresponding, pulse-width modulator controlled pulse duty factor of transistor TR of switched-mode power supply unit SNT. The pulse duty factor is considerably increased in this process, i.e., the transistor blocks only for short periods in relation to the duration of the keying period.

As can be gathered from FIG. 2, this shift of the operating point is no longer possible when the current transformer supplies only a small amount of power so that between curve d and power dissipation curve H, only one contact point 311 remains as the only possible operating point. However, even when approaching these low values of voltage and current of the current transformer, output capacitor CA can still be sufficiently charged to supply power to the tripping circuit and the switched-mode power supply unit.

In principle, the operating point can also be shifted to point $P'_b$ of curve b intersecting hyperbola H, this being the operating point of the switched-mode power supply unit when the charging of capacitor CA is completed. Such an adjustment of the operating point, however, is disadvantageous for measuring the current flowing through the conductor with regard to the current transformer that is to be used to carry out this measurement. As mentioned above, it is advantageous to perform the current measurement using a current transformer termination having the lowest possible resistance, i.e., in the range of low output voltage of the current transformer (=low input voltage of the switched-mode power supply unit) and high output current of current transformer SW.

For the sake of completeness, it should be pointed out that in the event that only a step-up transformer is provided in the switched-mode power supply unit, only that portion of the range above hyperbola H in the diagram of FIG. 2 is available for selecting the operating point, which is the portion available below the voltage value indicated by Um (for any current I). This is not a substantial limitation, however, because it may be eliminated using a switched-mode power supply unit according to the transformer principle, in particularly a flyback converter.

The block diagram of FIG. 3 is provided to illustrate this refinement. The reference symbols described in connection with FIG. 1 have the same meaning in FIG. 3.

FIG. 3 shows a switched-mode power supply unit SNT having a flyback converter. As a further essential element, this switched-mode power supply unit SNT includes transistor TR, which is to be controlled by a pulse width modulation circuit. In accordance with feature 1.5 (above), a microprocessor MYP having a maximum power point MPP regulator is provided here, from which switching transistor TR of the switched-mode power supply unit is controlled in a pulsed manner. Such MPP regulators are known as electronic components. They work according to the principle of finding out and adjusting the maximum power matching (with the load resistance) in each case by continuous variation. In a different context, the article "Solarenergie Optimal Nutzen" published in Elektronik 16 describes such a technology, for example, in the utilization of solar energy.

What is claimed is:

1. A circuit configuration for supplying power to an electronic tripping device, comprising:

a current-transforming device, a rectified output voltage of the current transforming device being fed to a charging capacitor;

a switched-mode power supply unit connected downstream from the charging capacitor for voltage control, the switched-mode power supply unit including a diode, a switching transistor, and a pulse modulation circuit, the diode charging an output capacitor connected in parallel to the electronic tripping device, the switching transistor controlling the charging of the output capacitor, the pulse width modulation circuit controlling the switching transistor, the pulse width modulation circuit controlling the switching transistor at a very high pulse duty factor when a set point of an output voltage at the output capacitor is reached; and a maximum power point regulator connected to the pulse width modulation circuit, the maximum power point controlling the pulse width modulation circuit during an initial charging phase of the output capacitor so that an optimal operating point of maximum power matching is adjusted.

2. The circuit configuration according to claim 1, wherein the switched-mode power supply unit is one of a choke transforming device and step-up transforming device.

3. The circuit configuration according to claim 1, wherein the switched-mode power supply unit further includes a flyback converter.

* * * * *